(12) United States Patent
Balaban et al.

(10) Patent No.: US 6,338,071 B1
(45) Date of Patent: Jan. 8, 2002

(54) METHOD AND SYSTEM FOR PROVIDING A CONTRACT MANAGEMENT SYSTEM USING AN ACTION-ITEM TABLE

(75) Inventors: David J. Balaban, San Rafael; James Snyder, San Jose, both of CA (US)

(73) Assignee: Affymetrix, Inc., Santa Clara, CA (US)

( * ) Notice: Subject to any disclaimer, the term of this patent is extended or adjusted under 35 U.S.C. 154(b) by 0 days.

(21) Appl. No.: 09/377,022

(22) Filed: Aug. 18, 1999

(51) Int. Cl.[7] .............................................. G06F 17/00
(52) U.S. Cl. ............................ 707/104; 707/6; 707/10; 707/102
(58) Field of Search ................................. 707/1–2, 104, 707/10, 102, 103, 7; 705/412; 700/95; 345/331

(56) References Cited

U.S. PATENT DOCUMENTS

| | | | | |
|---|---|---|---|---|
| 5,570,291 A | * | 10/1996 | Dudle et al. ................... | 700/95 |
| 5,724,575 A | * | 3/1998 | Hoover et al. ................. | 707/1 |
| 5,758,331 A | * | 5/1998 | Johnson ....................... | 705/412 |
| 5,767,848 A | * | 6/1998 | Matsuzaki et al. ........... | 345/331 |
| 6,006,215 A | * | 12/1999 | Retallick ....................... | 707/2 |
| 6,032,151 A | * | 2/2000 | Arnold et al. ................ | 707/103 |

\* cited by examiner

*Primary Examiner*—Diane D. Mizrahi
(74) *Attorney, Agent, or Firm*—Philip L. McGarrigle; Alan B. Sherr; Vernon Norviel

(57) ABSTRACT

Described is a novel relational database architecture that is adapted to storing information regarding the terms of one or more contracts, and the actions required to be performed under it. The database resides on a computer-readable storage medium as part of a multi-user computer network. By using simple subroutines readily apparent to one skilled in the computer arts, one can automatically generate alerts whenever an action needs to be performed. These alerts are then transmitted to users along the multi-computer network, appearing in an e-mail message that specifies the action, the individuals performing it, and the duties of each of these individuals. In this manner, one can ensure timely execution of the actions required under a contract.

9 Claims, 5 Drawing Sheets

METHOD AND SYSTEM FOR PROVIDING A CONTRACT MANAGEMENT SYSTEM USING AN ACTION-ITEM TABLE

FIELD OF THE INVENTION

Embodiments of the present invention are directed to a method for storing, in a relational database, data that describes the terms of a contract and the events arising under it that require a party to perform a particular action.

BACKGROUND OF THE INVENTION

Every contract defines, to a given extent, the rights and obligations of the parties to it. For example, "Seller agrees to sell 100 widgets to Buyer, and Buyer agrees to buy 100 widgets from Seller." Even in this simple contract, both parties have obtained rights and incurred obligations: the seller has obtained a right to collect payment from the buyer, but also incurred an obligation to supply the buyer with widgets; the buyer has obtained similar rights and obligations. Each of these rights and obligations require the parties to perform some action. In this case, it is the physical delivery of widgets by the seller and the tender of payment by the buyer.

As modern commercial arrangements between parties have become more complex, so to have the contracts that govern their relationships. As a result, a typical contract may require various parties to perform a multitude of actions, ranging from delivering a product to inspecting a manufacturing plant to perfecting patent rights. There is therefore a need to 1) identify the actions required by parties to a contract; 2) identify the time and date upon which such actions need to be performed; 3) determine the individuals responsible for performing the action; and 4) notify these individuals and apprise them of the action they must perform. In complex arrangements between parties, this is not a simple task. Complicating this task further is the fact that the arrangement may persist for many years, requiring one to repeat the foregoing steps many times during this period. In addition, an entity may have several contracts, perhaps even several hundreds of them, that require its attention. This can make the process of identifying actions and alerting individuals to perform them a difficult task.

There presently does not exist an effective tool designed specifically for managing the events that arise under a contract. Typical prior art methods merely alert a user that a pre-programmed event is about to occur; that, for example, an appointment will be begin within the next fifteen minutes, or that a report is due by the following day. Such methods are employed by the popular programs Microsoft® Outlook and Lotus® Organizer®. In order to generate such alerts, one must program each of them individually. This may be convenient enough when only a few alerts are required, but a burden when many contracts are involved, each requiring many actions to be performed. There therefore exists a need in the art for managing the events that arise during the life a contract, and alerting the appropriate personnel of such events.

SUMMARY OF THE INVENTION

It is an object of the present invention to provide a method for storing data that describes the terms of a contract and the events arising under it. It is a further object of the present invention to provide a database that associates the events with individuals designated to perform whatever action is required by the event. Still another object of the present invention is to provide a method that automatically alerts the appropriate individuals when an action needs to be performed, thus helping to ensure compliance with a contract.

Described herein is a novel relational database architecture that is adapted to storing information regarding the terms of a contract, the events arising under it that require one or more individuals to perform an action, and the duties of such individuals in performing that action. In one presently preferred embodiment of the invention, the relational database resides on a computer-readable storage medium as part of a multi-user computer network. By using simple subroutines readily apparent to one skilled in the computer arts, one can automatically generate alerts whenever an action needs to be performed. These alerts are then transmitted to users along the multi-computer network, appearing in an e-mail message that specifies the action, the individuals performing it, and the duties of each of these individuals. In this manner, one can ensure timely execution of the actions required under a contract.

The invention described herein is particularly useful when one needs to manage several contracts or contracts of a complex nature. A further understanding of the nature and advantages of the invention may be realized by reference to the remaining portions of the specification and the attached drawings.

DETAILED DESCRIPTION OF THE INVENTION

Figure 1:
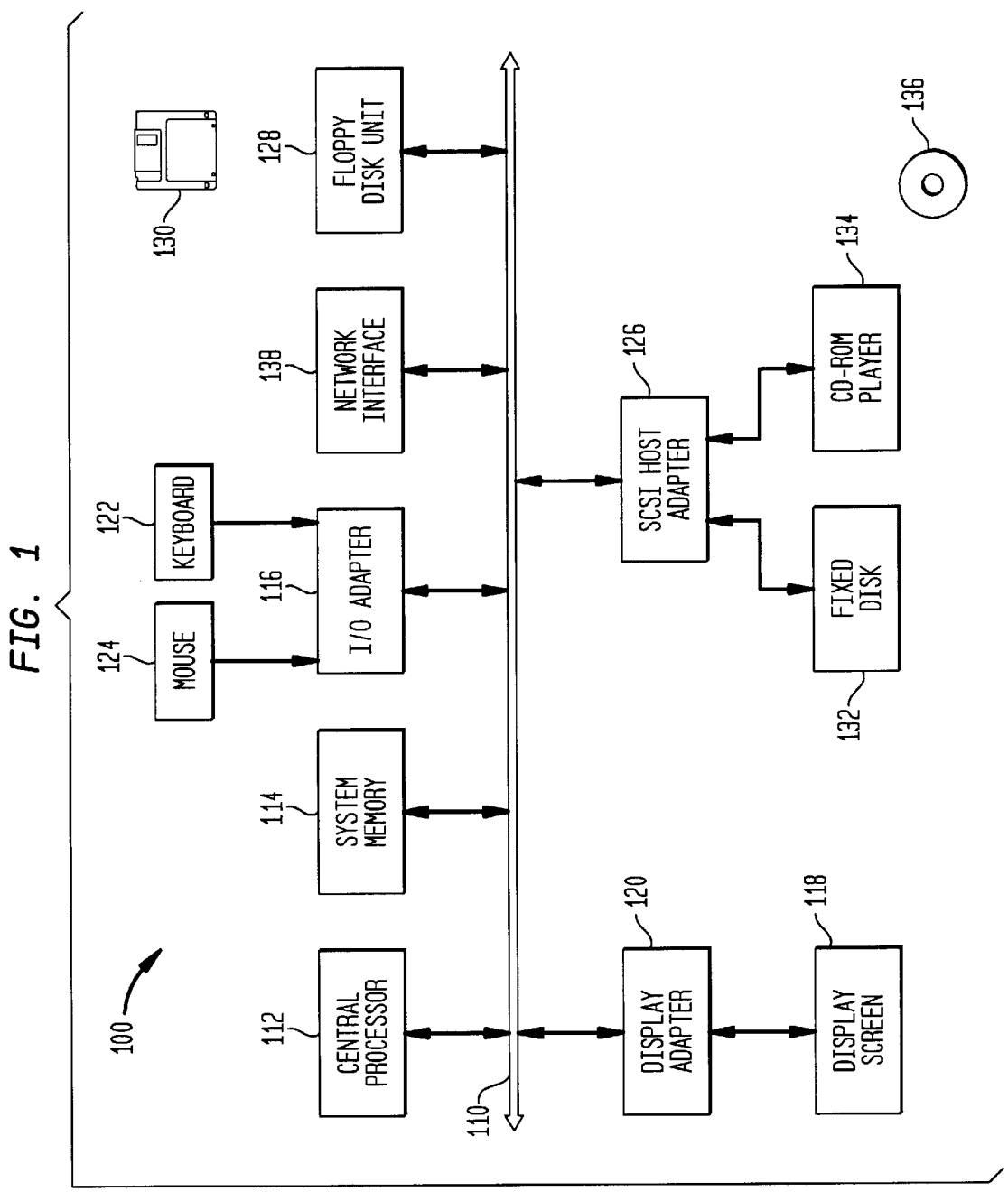
FIG. 1 illustrates a computer system suitable for use in conjunction with the relational database of the invention.

FIG. 1 depicts a block diagram of a host computer system 100 suitable for implementing the present invention. Host computer system 100 includes a bus which interconnects major subsystems such as a central processor 112, a system memory 114 (typically RAM), an input/output (I/O) adapter 116, an external device such as a display screen 118 via a display adapter 120, a keyboard 122 and a mouse 124 via an I/O adapter 116, a SCSI host adapter 126, and a floppy disk drive 128 operative to receive a floppy disk 130. SCSI host adapter 126 may act as a storage interface to a fixed disk drive 132 or a CD-ROM player 134 operative to receive a CD-ROM 136. Fixed disk 132 may be a part of host computer system 100 or may be separate and accessed through other interface systems. A network interface 138 may provide a direct connection to a remote server via a telephone link or to the Internet. Network interface 138 may also connect to a local area network (LAN) or other network interconnecting many computer systems. Many other devices or subsystems (not shown) may be connected in a similar manner.

Also, it is not necessary for all of the devices shown in FIG. 1 to be present to practice the present invention, as discussed below. The devices and subsystems may be interconnected in different ways from that shown in FIG. 1. The operation of a computer system such as that shown in FIG. 1 is readily known in the art and is not discussed in detail in this application. Code to implement the present invention, may be stored in computer-readable storage media such as system memory 114, fixed disk 132, CD-ROM 136, or floppy disk 130.

Figure 2:
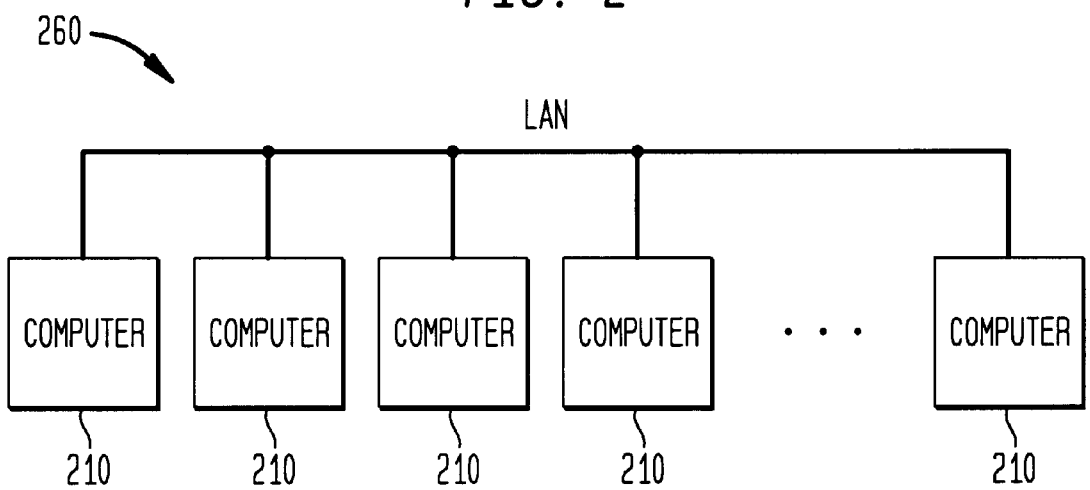
FIG. 2 illustrates a computer network suitable for use in conjunction with the relational database of the invention.

FIG. 2 depicts a network 260 interconnecting multiple computer systems 210. Network may be a local area network (LAN), wide area network (WAN), etc. The relational database and the computer-related operations of the other elements of FIG. 2 may be divided amongst computer systems 210 in any way with the network being used to communicate information among the various computers. Portable storage media such as floppy disks may be used to carry information between computers instead of network 260.

The database of the invention is a relational database with a simple internal structure. The structure and contents of this database will be described with reference to a logical model that describes the contents of tables of the database as well as interrelationships among the tables. A visual depiction of this model will be an Entity Relationship Diagram (ERD) which includes entities, relationships, and attributes. A detailed discussion of ERDs is found in "ERwin version 3.0 Methods Guide" available from Logic Works, Inc. of Princeton, New Jersey, and in "Database Design for Mere Mortals," available from Addison-Wesley Developers Press of Reading, Massachusetts, the contents of both of which are herein incorporated by reference. Those of skill in the art will appreciate that automated tools such as Developer 2000 available from Oracle will convert the ERD from FIG. 3 directly into executable code such as SQL code for creating and operating the database.

Figure 3:
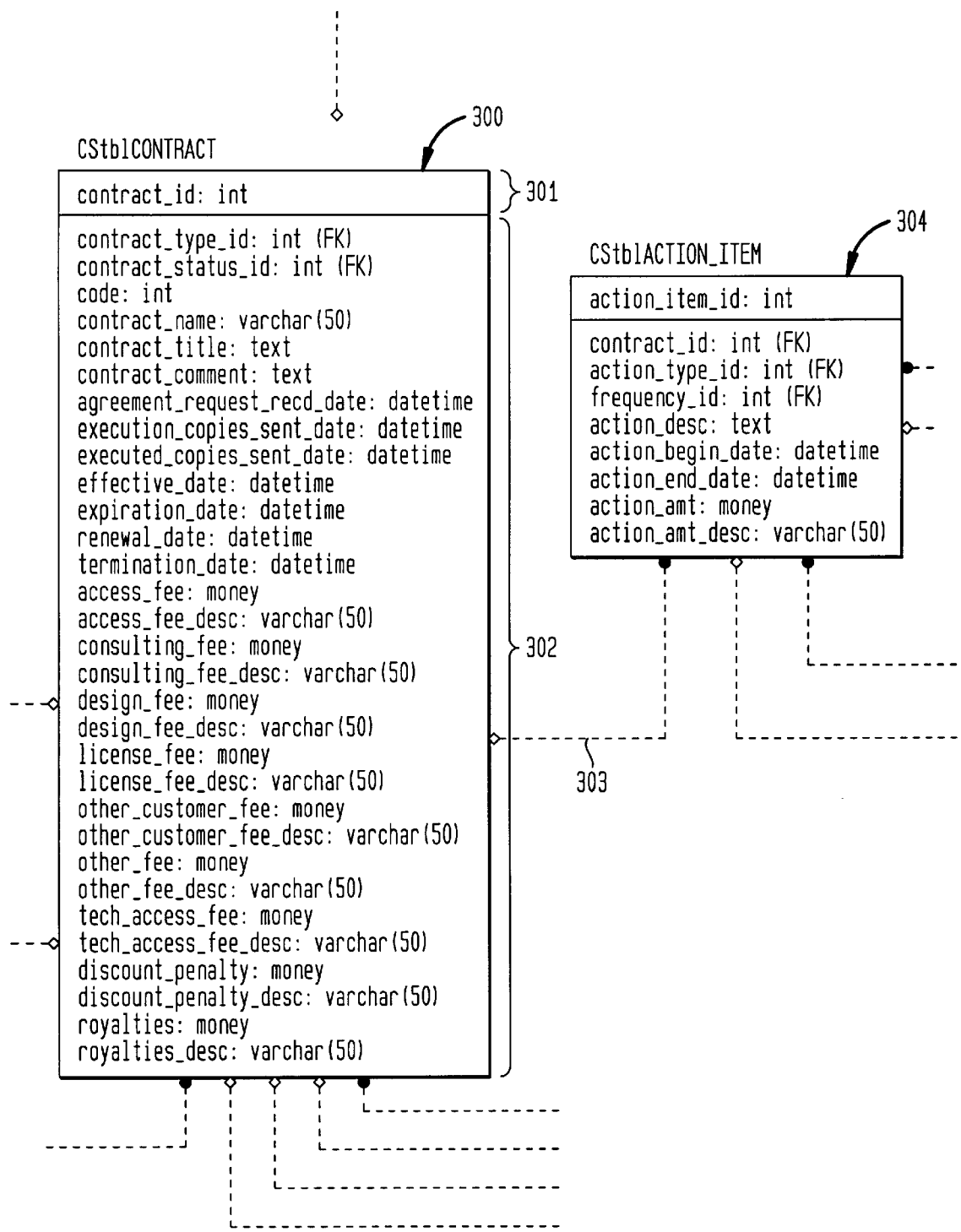
FIG. 3 illustrates a key for interpreting a database model.

FIG. 3 is a key to the ERD that will be used to describe the contents of chip design database. A representative table 300 includes one or more key attributes 301 and one or more non-key attributes 302. Representative table 300 includes one or more records where each record includes fields corresponding to the listed attributes. The contents of the key fields taken together identify an individual record. In the ERD, each table is represented by a rectangle divided by a horizontal line. The fields or attributes above the line are key while the fields or attributes below the line are non-key. An identifying relationship 303 signifies that the key attribute of a parent table 300 is also a key attribute of a child table 304. A non-identifying relationship signifies that the key attribute of a parent table is also a non-key attribute of a child table. Where (FK) appears in parenthesis, it indicates that an attribute of one table is a key attribute of another table. For both the non-identifying and the identifying relationship, one record in the parent table corresponds to one or more records in the child table. Table 1, below, further describes the terms used in various tables.

TABLE 1

ENTITY RELATIONSHIP DIAGRAM KEY

◇------------------------●
| | | |
|---|---|---|
| Relationship: one | | many |
| PK | = | primary key |
| FK | = | foreign key |
| CS | = | contract summary |
| int | = | integer |
| varchar | = | alphanumeric character |
| datetime | = | date and time |
| money | = | dollar amount |
| text | = | text |
| (η) | = | referring to a field η characters in length |

At the highest level, the relational database of the invention may be understood as providing a relational structure principally among contract items and action items. The contract items describe the terms of the contract and the events that arise under it, while the action items describe and any action that these events require. For example, a contract item could provide "Payment due supplier," whereas the corresponding action item would provide "pay $ 500 to supplier on May 5." In one presently preferred embodiment, additional items facilitate the execution of the action items, such as product items, client items, employee items, and contact information for both employees and clients.

Figure 4A:
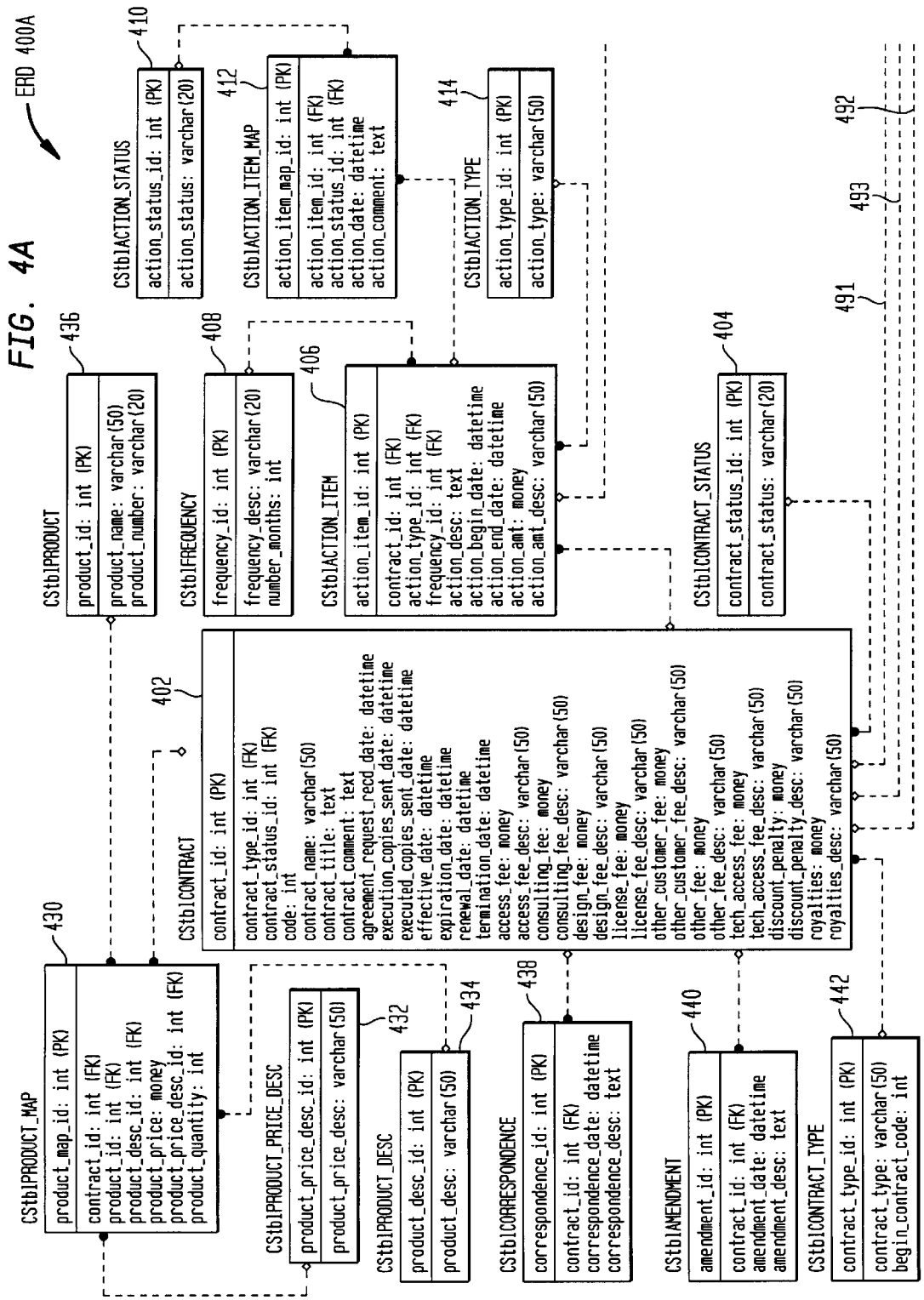
FIGS. 4(A–B) illustrates a relational database model according to one embodiment of the invention.
Figure 4B:
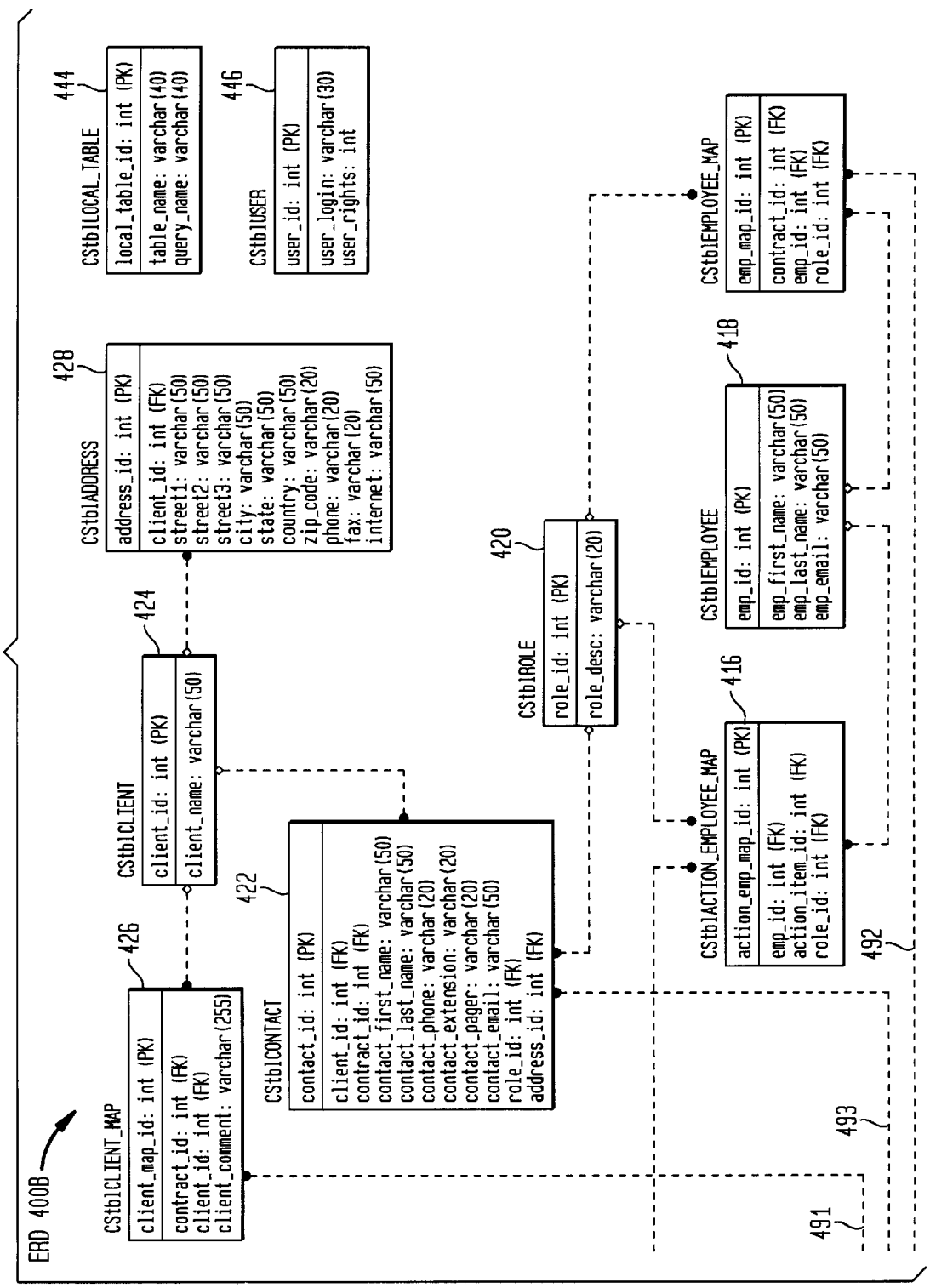

FIG. 4 is an entity relationship diagram (ERD) showing elements of the relational database according to one embodiment of the present invention. Each rectangle in the diagram corresponds to a table in database. For each rectangle, the title of the table is listed above the rectangle. Within each rectangle, columns of the table are listed. Above a horizontal line within each rectangle are listed key columns, columns whose contents are used to identify individual records in the table. Below this horizontal line are the names of non-key columns. The lines between the rectangles identify the relationships between records of one table and records of another table.

Table 2, below, describes the contents of each field with the tables depicted in FIG. 4.

| TABLE | Field | Contents |
|---|---|---|
| CStblCONTRACT (402) | | |
| | contract_id: Int (PK) | Contract Identification number |
| | contract_type_id: Int (FK) | Contract type identification number |
| | contract_status_id: Int (FK) | Contract status identification number |
| | code: Int | Generated code value |
| | contract_name: varchar (50) | Contract name |
| | contract_title: text | Contract title |
| | contract_comment: text | Comments regarding the contract |
| | agreement_request_recd_date: datetime | Agreement request receive date (?) |
| | execution_copies_sent_date: datetime | Date execution copies of the contract are sent |
| | executed_copies_sent_date: datetime | Date executed copies of the contract are |

-continued

| TABLE | Field | Contents |
|---|---|---|
| | | sent |
| | effective_date: datetime | Effective date of the contract |
| | expiration_date: datetime | Expiration date of the contract |
| | renewal_date: datetime | Renewal date of the contract |
| | termination_date: datetime | Termination date of the contract |
| | access_fee: money | Access fee |
| | access_fee_desc: varchar (50) | Access fee description |
| | consulting_fee: money | Consulting fee |
| | consulting_fee_desc: varchar (50) | Consulting fee description |
| | design_fee: money | Design fee |
| | design_fee_desc: varchar (50) | Design fee description |
| | license_fee: money | License fee |
| | license_fee_desc: varchar (50) | License fee description |
| | other_customer_fee: money | Other customer fees |
| | other_customer_fee_desc: varchar (50) | Other customer fees description |
| | other_fee: money | Other fee |
| | other_fee_desc: varchar (50) | Other fee description |
| | tech_access_fee: money | Technology access fee |
| | tech_access_fee_desc: varchar (50) | Technology access fee description |
| | discount_penalty: money | Discount penalty |
| | discount_penalty_desc: varchar (50) | Discount penalty description |
| | royalties: money | Royalties |
| | royalties_desc: varchar (50) | Royalties description |
| CStblCONTRACT_STATUS (404) | | |
| | contract_status_id: Int (PK) | Contract status identification number |
| | contract_status: varchar (20) | Contract status |
| CStblACTION_ITEM (406) | | |
| | action_item_id: Int (PK) | Action item identification number |
| | contract_id: Int (FK) | Contract identification number |
| | action_type_id: Int (FK) | Action type identification number |
| | frequency_id: Int (FK) | Frequency identification number |
| | action_desc: text | Action description |
| | action_begin_date: datetime | Action begin date |
| | action_end_date: datetime | Action end date |
| | action_amt: money | Action amount |
| | action_amt_desc: varchar (50) | Action amount description |
| CStblFREQUENCY (408) | | |
| | frequency_id: Int (PK) | Frequency identification number |
| | frequency_desc: varchar (20) | Frequency |
| | number_months: Int | Number of months |
| CStblACTION_STATUS (410) | | |
| | action_status_id: Int (PK) | Action status identification number |
| | action_status: varchar (20 | Action status |
| CStblACTION_ITEM_MAP (412) | | |
| | action_item_map_id: Int (PK) | Action item map identification number |
| | action_item_id: Int (FK) | Action item identification number |
| | action_status_id: Int (FK) | Action status identification number |
| | action_date: datetime | Action date |
| | action_comment: text | Action comment |
| CStblACTION_TYPE (414) | | |
| | action_type_id: Int (PK) | Action type |

-continued

| TABLE | Field | Contents |
|---|---|---|
| | action_type: varchar (50) | identification number<br>Action type |
| CStblACTION_EMPLOYEE_MAP (416) | | |
| | action_emp_map_id: Int (PK) | Action employee map identification number |
| | emp_id: Int (FK) | Employee identification number |
| | action_item_id: Int (FK) | Action item identification number |
| | role_id: Int (FK) | Role identification number |
| CStblEMPLOYEE (418) | | |
| | emp_id: Int (PK) | Employee identification number |
| | emp_first_name: varchar (50) | Employee first name |
| | emp_last_name: varchar (50) | Employee last name |
| | emp_email: varchar (50) | Employee email address |
| CStblROLE (420) | | |
| | role_id: Int (PK) | Role identification number |
| | role_desc: varchar (20) | Role description |
| CStblCONTACT (422) | | |
| | contact_id: Int (PK) | Contact identification number |
| | contract_id: Int (FK) | Contract identification number |
| | client_id: Int (FK) | Client identification number |
| | address_id: Int (FK) | Address identification number |
| | role_id: Int (FK) | Role identification number |
| | contact_first_name: varchar (50) | Contact first name |
| | contact_last_name: varchar (50) | Contact last name |
| | contact_phone: varchar (20) | Contact phone number |
| | contact_extension: varchar (20) | Contact extension number |
| | contact_pager: varchar (20) | Contact pager number |
| | contact_email: varchar (50) | Contact email address |
| CStblCLIENT (424) | | |
| | client_id: Int (PK) | Client identification number |
| | client_name: varchar (50) | Client name |
| CStblCLIENT_MAP (426) | | |
| | client_map_id: Int (PK) | Client map identification number |
| | contract_id: Int (FK) | Contract identification number |
| | client_id: Int (FK) | Client identification number |
| | client_comment: varchar (255) | Client comment |
| CStblADDRESS (428) | | |
| | address_id: Int (PK) | Address identification number |
| | client_id: Int (FK) | Client identification number |
| | street1: varchar (50) | First line of street address |
| | street2: varchar (50) | Second line of street address |
| | street3: varchar (50) | Third line of street address |
| | city: varchar (50) | City |
| | state: varchar (50) | State |
| | country: varchar (50) | Country |
| | zip_code: varchar (20) | Zip code |
| | phone: varchar (20) | Phone number |

-continued

| TABLE | Field | Contents |
|---|---|---|
| | fax: varchar (20) | Fax number |
| | internet: varchar (50) | Internet uniform reference locator |
| CStblPRODUCT_MAP (430) | | |
| | product_map_id: Int (PK) | Product map identificaiton number |
| | contract_id: Int (FK) | Contract identification number |
| | product_id: Int (FK) | Product identification number |
| | product_desc_id: Int (FK) | Product description identification number |
| | product_price: money | Product price |
| | product_price_desc_id: Int (FK) | Product price description identification number |
| | product_quantity: Int | Product quantity |
| CStblPRODUCT_PRICE_DESC (432) | | |
| | product_price_desc_id: Int (PK) | Product price description identification number |
| | product_price_desc: varchar (50) | Product price description |
| CStblPRODUCT_DESC (434) | | |
| | product_desc_id: Int (PK) | Product description identification number |
| | product_desc: varchar (50) | Product description |
| CStblPRODUCT (436) | | |
| | product_id: Int (PK) | Product identification number |
| | product_name: varchar (50) | Product name |
| | product_number: varchar (20 | Product number |
| CStblCORRESPONDENCE (438) | | |
| | correspondence_id: Int (PK) | Corespondence identification number |
| | contract_id: Int (FK) | Contract identification number |
| | correspondence_date: datetime | Correspondence date |
| | correspondence_desc: text | Correspondence description |
| CStblAMENDMENT (440) | | |
| | amendment_id: Int (PK) | Amendment identification number |
| | contract_id: Int (FK) | Contract identification number |
| | amendment_date: datetime | Amendment date |
| | amendment_desc: text | Amendment description |
| CStblCONTRACT_TYPE (442) | | |
| | contract_type_id: Int (PK) | Contract type identification number |
| | contract_type: varchar (50) | Contract type |
| | begin_contract_code: Int | Begin contract code |
| CStblLOCAL_TABLE (444) | | |
| | local_table_id: Int (PK) | Local table identification number |
| | Table_name: varchar (40) | Table name |
| | Query_name: varchar (40) | Query name |
| CStblUSER (446) | | |
| | User_id: Int (PK) | User identification number |
| | User_login: varchar (30) | User login |
| | User_rights: Int | User rights |

It is understood that the examples and embodiments described herein are for illustrative purposes only and that various modifications or changes in light thereof will be suggested to persons skilled in the art and are to be included within the spirit and purview of this application and scope of the appended claims. For example, tables may be deleted, contents of multiple tables may be consolidated, or contents of one or more tables may be distributed among more tables than described herein to improve query speeds and/or to aid system maintenance. Also, the database architecture and data models described herein are not limited to biological applications but may be used in any application. All publications, patents, and patent applications cited herein are hereby incorporated by reference.

What is claimed is:

1. A contract management system comprising:
 a server network including a programmable computer joined to a plurality of computer terminals;

a computer-readable storage medium having stored thereon a relational database, the relational database comprising:
a contract table including a plurality of contract records, each contract record specifying terms of at least one contract; and
an action-item table including a plurality of a action-item records, each action-item record specifying at least one event occurring during the life of a particular contract;
wherein there is a one-to-many relationship between the contract records and the action-item records;
means for inputting data, including data representing a first event that requires at least one individual to perform an action, into the relational database;
means for storing the data representing the first event in a first action-item record of the action-item table;
means for determining that the first event has occurred; and
means for transmitting to at least one computer terminal an alert that the first event has occurred.

2. The system of claim 1, wherein:
each action-item record specifies at least one event that requires at least one party to a particular contract to perform an action.

3. The system of claim 1, wherein:
the relational database further comprises a product table including a plurality of product records, each product record specifying at least one product falling within the scope of a particular contract, wherein there is a one-to-many relationship between the contract records and the product records.

4. The system of claim 1, wherein:
the relational database further comprises a client table including a plurality of client records, each client record specifying at least one client having rights affected by the contract,
wherein there is a one-to-many relationship between the contract records and the client records.

5. The system of claim 1, wherein:
the relational database further comprises a contact table including a plurality of contact records, each contact records specifying contact information for at least one client, wherein there is a many-to-many relationship between the contact records and the client-records.

6. The system of claim 1, wherein:
the relational database further comprises a contact table including a plurality of contact records, each contact record specifying contact information for at least one individual, wherein there is a one-to-many relationship between the contract records and the contact records.

7. The system of claim 1, wherein:
the relational database further comprises an employee table including a plurality of employee records, each employee record specifying at least one employee, wherein there is a one-to-many relationship between the contract records and the employee records.

8. The system of claim 1, wherein:
the relational database further comprises an employee table including a plurality of employee records, each employee record specifying at least one employee, and an employee-action table including a plurality of employee-action records, each employee-action record specifying a role to be assumed by at least one employee in performing an action, wherein there is a many-to-many relationship between the employee records and the employee-action records, and a one-to-many relationship between the employee-action records and the action-item records.

9. A method for operating a relational database comprising:
creating a contract table including a plurality of contract records, each contract record specifying terms of at least one contract;
creating an action-item table including a plurality of action-item records, each action-item record specifying at least one event occurring during the life of a particular contract;
inputting data, including data representing a first event that requires at least one individual to perform an action, in the action-item table;
determining that the first event has occurred; and
transmitting to at least one computer terminal an alert that the first event has occurred;
wherein there is a one-to-many relationship between the contract records and the action-item records.

* * * * *